Patented July 2, 1935

2,006,538

UNITED STATES PATENT OFFICE 2,006,538

NITRO-AMINO-ALKOXY-DIPHENYL

Samuel Coffey and Keith William Palmer, Huddersfield, England, assignors to Imperial Chemical Industries Limited, a corporation of Great Britain No Drawing. Application February 26, 1932, Serial No. 595,421. In Great Britain March 2, 1931

6 Claims. (Cl. 260—130.5)

This invention relates to nitro-amino-diaryl compounds, more particularly nitro-amino-diphenyl derivatives, and a process for the manufacture thereof.

It is an object of the invention to produce new compounds which are especially valuable in the dyestuffs industry. A further object is the provision of a new and improved process for treating diphenyl derivatives having a nitro group substituted in each phenyl nucleus, whereby a selective reduction of the nitro group in one nucleus occurs without affecting the nitro group in the second nucleus. Other objects of the invention will be apparent by reference to the following description thereof.

These objects are accomplished according to the invention whereby 3-nitro-3'-amino-4,4'-dialkoxydiphenyls are obtained by treating 3,3'-dinitro-4,4'-dialkoxydiphenyls, preferably in solution, with a chosen amount of an alkali hydrogen sulphide, alkali sulphide, or alkali polysulphide at an elevated temperature.

While the invention is susceptible of considerable variation and modification in the manner of its practical application, particularly as regards the proportions of reducing agent and other materials employed and the exact method of procedure, the following examples, in which the proportions are given in parts by weight, will serve to illustrate how the invention may be practiced.

Example I

A solution in ethyl alcohol of 92 parts of sodium hydrogen sulphide is prepared, e. g. by dissolving 396 parts of crystallized sodium sulphide in about 1000 parts of ethyl alcohol and adding about 300 parts of 30% hydrochloride acid. To this is added 332 parts of 3,3'-dinitro-4,4'-diethoxy-diphenyl previously mixed with about 1000 parts of ethyl alcohol. The mixture is boiled in a suitable reflux condenser for about three hours. On cooling 3-nitro-3'-amino-4,4'-diethoxy-diphenyl crystallizes out and is filtered off and washed. The yield is about 260 parts, i. e. 86% theory, and the product has a melting point of about 172° C.

In the above example, the sodium hydrogen sulphide may be replaced by a quantity of sodium sulphide or sodium polysulphide of equivalent reducing power.

Example II

Three hundred four parts of 3,3'-dinitro-4,4'-dimethoxy-diphenyl are used in place of the 332 parts of 3,4'-dinitro-4,4'-diethoxy-diphenyl used in Example I. The procedure is unchanged. The product, 3-nitro-3'-amino-4,4'-dimethoxydiphenyl, has a melting point of about 182–183° C.

As previously indicated, the invention is not limited by the above examples. It will be understood that the alkali sulphide, alkali hydrogen sulphide, or alkali polysulphide employed in accordance with the invention may be any ammonium or alkali metal sulphide, hydrogen sulphide, or polysulphide. Generally speaking, of the alkali metal compounds, the sodium and potassium derivatives are preferred.

It will be recognized that solvents other than ethyl alcohol, e. g. other alcohols, may be employed. In general, the reaction medium may be any solvent which does not affect the reaction unfavorably.

The 3,3'-dinitro-4,4'-dialkoxy-diphenyls to which the process of the invention is applied may be obtained in any suitable manner, e. g., by the methods described by Hirsch (Berichte der deutschen chemischen Gesellschaft, 1889, 22, 335).

The advantages of the invention will be apparent. The selective reduction of dinitro compounds to produce the products herein described has not heretofore been accomplished. The products obtainable in accordance with the invention, especially the nitro-amino-dimethoxy and diethoxy compounds are new and valuable intermediates for the production of dyes.

As many apparent and widely different embodiments of this invention may be made without departing from the spirit thereof, it is to be understood that we do not limit ourselves to the foregoing examples or description except as indicated in the following claims.

In the claims below it should be understood that where we speak of "an alkali metal sulphide", we mean to include in this phrase the normal sulphides, the hydrogen-sulphides, and polysulphides of alkali metals.

We claim:

1. A process for the manufacture of 3-nitro-3'-amino-4,4'-dimethoxy-diphenyl which comprises adding 304 parts of 3,3'-dinitro-4,4'-dimethoxy-diphenyl in about 1000 parts of ethyl alcohol to a solution prepared by introducing about 300 parts of 30% hydrochloric acid into a solution of 396 parts of sodium sulphide in about 1000 parts of ethyl alcohol, boiling the mixture under reflux for about three hours, and separating the 3-nitro-3'-amino-4,4'-dimethoxy-diphenyl.

2. The compound 3-nitro-3'-amino-4,4'-dimethoxy-diphenyl.

3. The compound 3-nitro-3'-amino-4,4'-diethoxydiphenyl.

4. The process of producing a 4,4'-dialkoxy-3-nitro-3'-amino-diphenyl, which comprises reacting a 4,4'-dialkoxy-3,3'-dinitro-diphenyl with a quantity of an alkali-metal sulphide sufficient to reduce one of the nitro groups but insufficient to reduce both nitro groups.

5. 4,4'-dialkoxy-3-nitro-3'-amino-diphenyl.

6. The process of producing a 4,4'-dialkoxy-3-nitro-3'-amino-diphenyl, which comprises refluxing a 4,4'-dialkoxy-3,3'-dinitro-diphenyl in alcoholic medium with a quantity of an alkali metal sulphide sufficient to reduce one of the nitro groups but insufficient to reduce both nitro groups.

SAMUEL COFFEY.
KEITH WILLIAM PALMER.